(12) United States Patent
Yoshimi et al.

(10) Patent No.: US 7,366,420 B2
(45) Date of Patent: Apr. 29, 2008

(54) OPTICAL TRANSMISSION DEVICE

(75) Inventors: Takahiro Yoshimi, Tokyo (JP); Ryuji Ohmuro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 702 days.

(21) Appl. No.: 10/808,022

(22) Filed: Mar. 23, 2004

(65) Prior Publication Data

US 2004/0190908 A1    Sep. 30, 2004

(30) Foreign Application Priority Data

Mar. 27, 2003  (JP) .............................. 2003-088480
Feb. 3, 2004   (JP) .............................. 2004-026753

(51) Int. Cl.
*H04B 10/00* (2006.01)

(52) U.S. Cl. .................... 398/129; 398/362; 359/259

(58) Field of Classification Search ........ 398/128–131, 398/362, 153, 23, 172, 101; 351/211, 200; 353/31; 359/259
See application file for complete search history.

(56) References Cited

U.S. PATENT DOCUMENTS

| | | | |
|---|---|---|---|
| 4,871,257 A | 10/1989 | Suzuki | |
| 5,349,176 A | 9/1994 | Czichy | |
| 5,627,669 A | 5/1997 | Orino | |
| 5,644,375 A * | 7/1997 | Suzuki | ........................ 351/208 |
| 6,178,024 B1 | 1/2001 | Degura | |
| 6,522,397 B2 * | 2/2003 | Barricau et al. | ............ 356/28.5 |
| 6,760,296 B1 * | 7/2004 | Baba et al. | ............. 369/112.05 |
| 2001/0052966 A1 * | 12/2001 | Fujitsuka et al. | ............... 355/53 |
| 2002/0036833 A1 * | 3/2002 | Miyata et al. | ............... 359/651 |
| 2004/0090599 A1 * | 5/2004 | Kowarz et al. | ................ 353/31 |
| 2004/0202482 A1 | 10/2004 | Usui | |
| 2005/0162995 A1 * | 7/2005 | Fukasawa et al. | ........ 369/44.23 |
| 2006/0262324 A1 * | 11/2006 | Hays et al. | .................. 356/519 |

FOREIGN PATENT DOCUMENTS

| | | |
|---|---|---|
| DE | 3855021 T2 | 2/1996 |
| EP | 0367407 A2 | 5/1990 |
| EP | 0876012 A2 | 11/1998 |
| GB | 2284478 A | 7/1995 |
| JP | 59-101827 A | 6/1984 |
| JP | 8-065243 A | 3/1996 |
| JP | 8-265263 A | 10/1996 |
| JP | 11-098081 A | 4/1999 |
| JP | 2002-118516 A | 4/2002 |
| JP | 2004-312698 A | 11/2004 |
| JP | 2004-312699 A | 11/2004 |

* cited by examiner

*Primary Examiner*—Chanh D. Nguyen
*Assistant Examiner*—Shaheda A Abdin
(74) *Attorney, Agent, or Firm*—Canon U.S.A. Inc. I.P. Division

(57) ABSTRACT

An optical transmission device for providing stable communication with a partner device by reducing errors in optical axis misalignment. Such errors are caused by uneven distribution of the light intensity in a received light beam resulting from atmospheric microscopic fluctuations. A cross pattern filter having at least two cross patterns is used at a partner transmission device side with respect to an incident direction detecting means, and arranged so that a cross pattern generated on the position detecting photodetector by the cross pattern filter and parting lines for dividing a position detecting photodetector do not overlap with each other, but intersect with each other.

7 Claims, 9 Drawing Sheets

OPTICAL TRANSMISSION DEVICE

BACKGROUND OF THE INVENTION

1. Field of the Invention

The present invention relates to communication devices and more specifically to optical transmission devices for providing two-way communication.

2. Description of the Related Art

Japanese Unexamined Patent Laid-Open No. 5-133716 discloses a conventional optical transmission device configured to perform two-way communication by using two communication devices that spatially separated from each other. FIG. 3 shows such an optical communication device A that communicates light beams LA as well as receives light beams LB from another communication device B (not shown).

In operation, a laser beam is emitted from a laser diode 101 and propagated as linearly polarized light through a lens group 102. Thereafter, it is reflected from a polarizing beam splitter 103, and then reflected by a variable-angle minor 104a of an optical axis adjusting unit 104 to the device B.

Similarly, the received light beam LB from device B is reflected by the variable-angle mirror 104a, through the beam splitter 103 to branching element 105. A substantial portion of the light beam LB is transmitted through the branching element 105 to a photodetector 106 by a lens group 107. The other portion of light beam LB is reflected from the branching element 105 to a photodetector 108, which is a position photodetector, via a lens group 109. A substantial portion (LBa) of the received light beam LB is transmitted through the beam branching element 105, and is converged onto a photodetector 106 by a lens group 107. The other portion of light beam LBb reflected from the beam branching element 105 is converged by a lens group 109 as a luminous flux which is received by a photodetector 108.

In order to achieve the most efficient transmission and reception of light, an optical axis 112 on the beam splitter side, which corresponds to the common optical axis for transmission and reception, can be backwardly inclined so that the directions of the transmitting light beam LA and the received light beam LB form right angles with respect to each other.

For high-capacity communication, a small element having an effective light receiving area of less than 1 mm, such as an avalanche photodetector, must be used as the photodetector 106. And, the positions of the photodetector 106 and the position detecting photodetector 108 are aligned so that the light beam LB falls on the effective receiving area of the photodetector 106. The variable-angle mirror 104a is adjusted so that the optical axis of the light beam LB is at the center of the photodetector 108.

For efficient communication, the optical axis of the light beam LA is aligned with the center of the photodetector 108. A spot SP generated on the surface of photodetector 108 by light beam LB, provides a misalignment information signal that is received and processed by a signal processing unit 110, which is then transmitted to a mirror drive control unit 111 to generate a correction signal. Based on this signal, the angle of the variable-angle mirror 104a is adjusted to continuously align the optical axes of the light beams LA and LB.

The photodetector 108 generally employs a quadrant photodetector, which is divided into four elements 121 by a separation area 122 as shown in FIG. 4. The method for detecting a position using a photodetector has been described in e.g., Japanese Laid-open patent 2001-94513. Such a photodetector 108 is arranged so that the light receiving surface (plate) of the quadrant photodetector is generally located in a position defocused to a converging point of the lens group 109.

However, the optical transmission device, which transmits and receives light beams through the atmospheric air in the related art described above is affected by a phenomenon in which the transmitted light beam fluctuates due to microscopic fluctuations in the air.

FIG. 5 is an explanatory drawing showing modeled microscopic fluctuations, in which the distribution of strength of the transmitting light fluctuates in the atmosphere. The symbol W designates the width of light beam LA from device B. Since atmospheric air is inhomogeneous, the refractive index varies spatially and temporally. When an air layer partially having a high refractive index exists in an optical pass of the transmission light LA, the portion of the high refractive index works as a convex lens, and thereby generates a light-concentrating effect and point W1, which is high in intensity, and point W2, which is low in intensity, are generated in the width W of the transmitting light beam LA at the position of the receiving device A.

Also, since the distribution of intensity varies temporally, point W2 appears to fluctuate within width W, a phenomena known as microscopic fluctuation. A disadvantage of the related art is that since the light receiving surface of the photodetector 108 is set at a position defocused from the converging point during microscopic fluctuations of the atmospheric air, the distribution of light intensity in spot SP becomes uneven.

In FIG. 5, the distribution of light intensity at the beam entrance of the device (the entrance pupil), is projected as shown. Consequently, the spot SP having an adequate area on the light receiving surface is as shown in FIG. 6.

As shown in FIG. 7, the spot SP having a diameter T, hatched portions P1 of high-intensity and portions P2 of low intensity are generated, and the center of light intensity PC, which differs from the center of luminous flux BC, is determined to be the optical axis. Therefore, misalignment of the direction of the optical axis of the transmitting light beam LA occurs by an angle corresponding to an amount of misalignment S, and consequently, the transmitting light beam LA is deviated from the device B, which can cause interruptions in the communication system.

To solve the above-mentioned problems, it is preferable that photodetector 108 is arranged in a position adjacent to the converging point of the lens group 109 and the size of the spot SP is arranged so as to be less than the minimum resolution of the device. However, the light beam can intersect separation area 122 between each of the divided elements, and when the spot SP crosses over the light beam intersects separation area 122, the output from the photodetector 108 suddenly becomes low and is stopped in the worse case.

In such a case, although the optical axis actually exists on the photodetector 108 and the communication is normally and rightly being conducted, the system wrongly detects that the optical axis has been misaligned and moves the mirror 104a so as to align the optical axis. Thereby the optical axis existing on the photodetector 108 is shifted out of the correct range and the communication is terminated.

SUMMARY OF THE INVENTION

The present invention resolves one or more of the aforementioned problems and provides a cost-effective optical transmission device that allows stable communication between two optical communication devices. Such stable communication is achieved despite the presence of microscopic fluctuations in the atmospheric air, which cause optical axis misalignment resulting from uneven distribution of light intensity in the received light beam. By employing the present invention, such optical axis misalignment errors are reduced or eliminated.

Accordingly, an optical transmission device according to the present invention includes a transmission unit for converting an electrical signal to an optical signal, and a light receiving unit for converting the received optical signal to an electrical signal. A position detecting photodetector having a plurality of light receiving units divided by parting lines for detecting the direction of incidence of a luminous flux emitted form a transmitting unit of an opposed partner device is provided, and wherein the shape of a spot of a position detecting light beam received by the position detecting photodetector is linearly elongated on the position detecting photodetector, and has a pattern, which satisfies relations:

$$L1/L2 > 3 \text{ and } L1 > 2^{1/2}D$$

where L1 represents the length of the major axis, L2 represents the length of the minor axis, and D represents the width of the parting lines. Further, the parting lines intersect with the spot shape at an angle.

As described above, in the optical transmission devices disposed opposite each other a predetermined distance apart and configured in such a manner that the device on the transmitting side converts an electrical signal to an optical signal and transmits it to the receiving device and the device on the receiving side converts the received optical signal into an electric signal so that two-way information transmission is effected, the optical transmission device having an incidence direction detecting means for detecting the direction of incidence of a luminous flux emitted from the opposed partner transmitting unit and directing a luminous flux emitted by itself toward the direction of incidence of the luminous flux, a cost-effective optical transmission device capable of performing stable communication is achieved by employing a cross pattern filter having two or more cross patterns on the side of the partner transmitting unit with respect to the incidence direction detecting means, and arranging the cross pattern filter at the position where a cross pattern generated on the position detecting photodetector by the cross pattern filter and parting lines for dividing the position detecting photodetector do not lose the detection of the optical axis by the separation area between each of the divided even though the photodetector for detecting the optical axis is arranged in a position adjacent to the converging point of the lens for converging light received from the destination.

Further objects, features and advantages of the present invention will become apparent from the following description of the preferred embodiments (with reference to the attached drawings).

DESCRIPTION OF THE PREFERRED EMBODIMENT

First Embodiment

Figure 1:
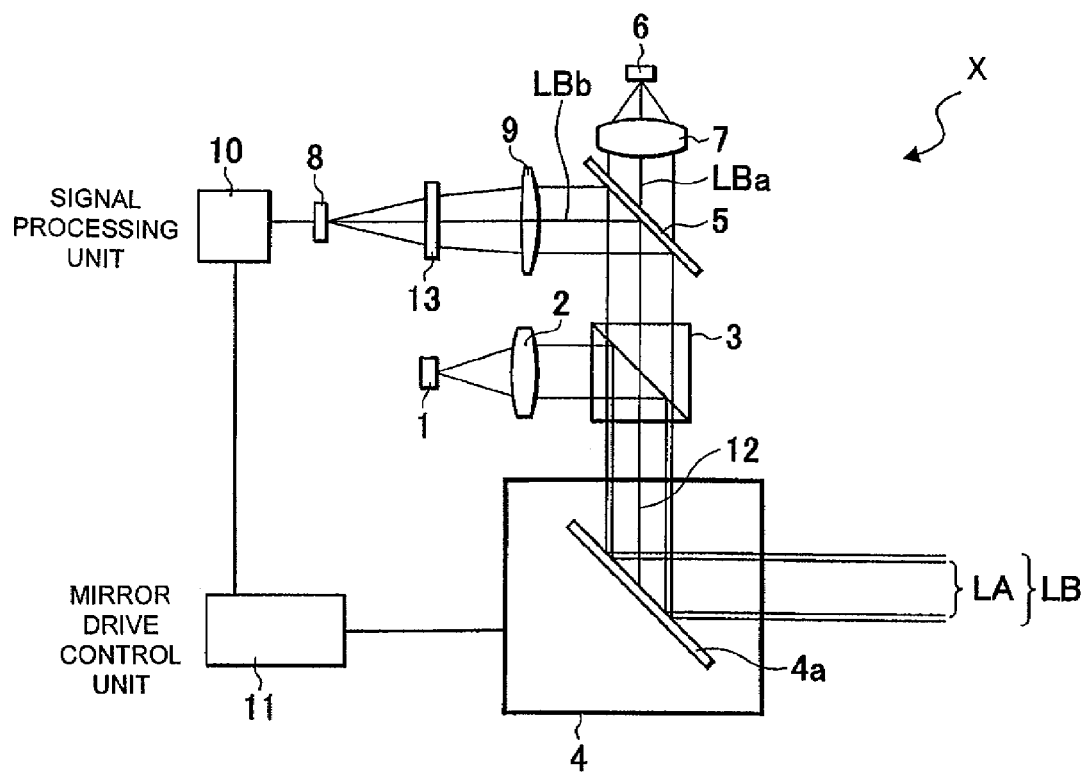
FIG. 1 is a block diagram of an optical transmission device according to an embodiment.

FIG. 1 is a schematic drawing showing an optical transmission device (device X) for providing stable communication with a device Y (not shown) according to a first embodiment of the present invention. A laser beam, which is emitted from a laser diode 1, is propagated as linearly polarized light and is transmitted through a lens group 2 (with positive power). The beam is reflected from a boundary surface of a polarizing beam splitter 3, and is reflected by a variable-angle mirror 4a of an optical-axis adjusting unit 4. It is then projected as transmitting light LA from device X to device Y.

A received light beam LB is transmitted from the device Y and is reflected by the variable-angle mirror 4a about an optical axis 12, and transmitted through the beam splitter 3 to a received light branching element 5. A substantial portion (LBa) of the received light beam LB is transmitted through the beam branching element 5, and is converged onto a photodetector 6 by a lens group 7. The photodetector 6 acts as a real signal photodetector. The other portion of light beam LBb reflected from the beam branching element 5 is converged by a lens group 9 as a luminous flux through a cross pattern filter 13 for receipt by a photodetector 8. Thereafter, signals generated by photodetector 8 are received and processed by a signal processing unit 10, which are then transmitted to a mirror drive control unit 11 to generate a correction signal.

Figure 8:
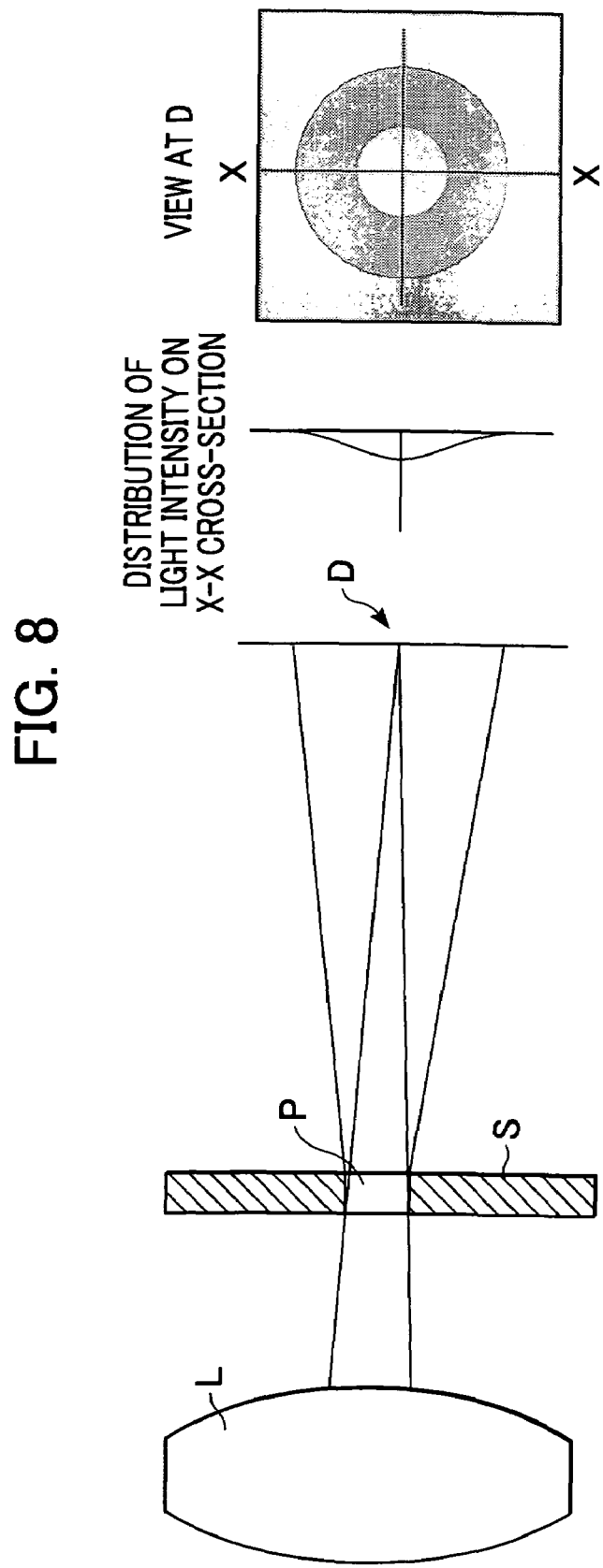
FIG. 8 is a pattern diagram showing a diffraction pattern occurring due to a pinhole.

Cross pattern filter 13 is a generic designation for an optical element generating radial striations from the luminous point of the image, and is also referred to as a cross filter, or a star filter. In operation, as shown in FIG. 8, a pinhole P is located on a shielding S between the lens and a focal point. Then, an optical image spreading from the center of the luminous flux passing through the pinhole P, which is the peak point, is observed at the focal point. The optical image spreads because the luminous flux does not converge to one point, but spreads due to diffraction when the luminous flux passes through the pinhole P.

Figure 9:
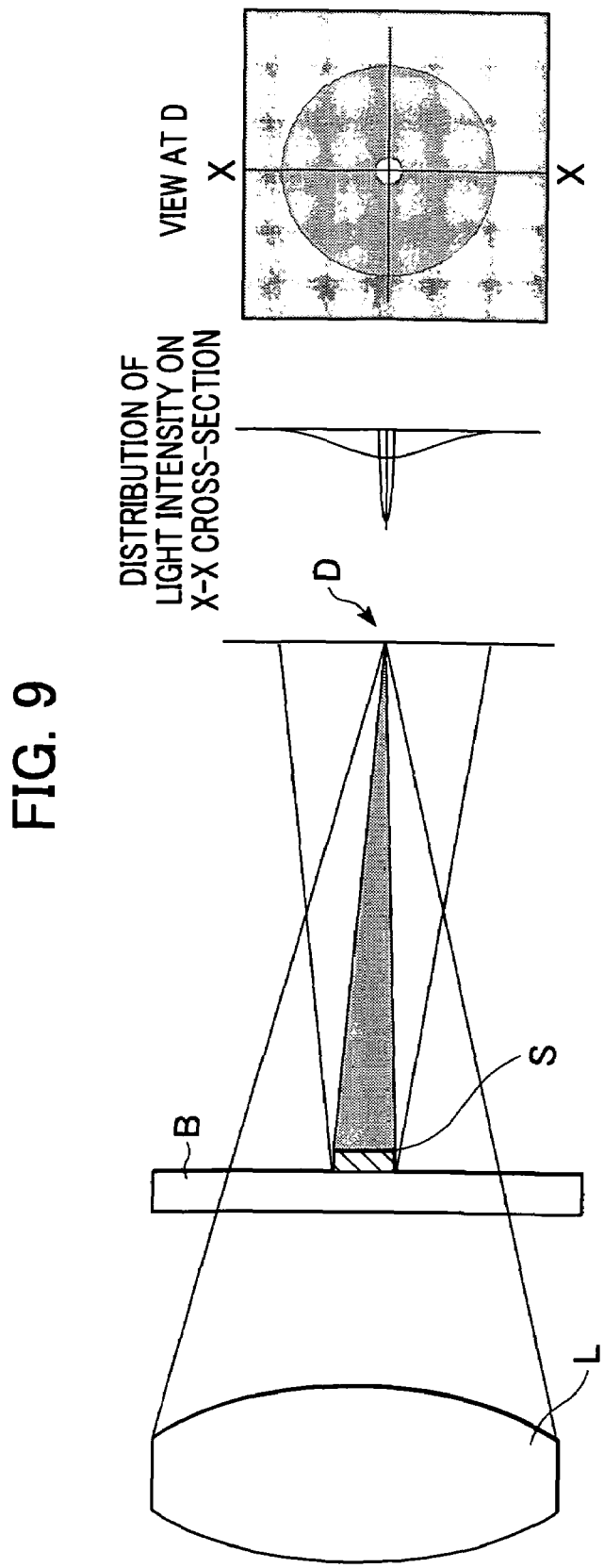
FIG. 9 is a pattern diagram showing a diffraction pattern according to Babinet's principle.

However, according to Baninet's principle, as shown in FIG. 9, when shielding S is the same size as the pinhole P, and the shielding is formed on a transparent substrate B, and an inverted pattern formed by inverting the positive and negative (translucent and opaque) portions is arranged, an optical image identical to that formed by the pinhole, but opposite from the pinhole P in terms of positive and negative is generated due to a shadow. The difference is that a bright point image is formed by light which passes through the portion other than the shielding S. That is, when the shielding S is placed in the luminous flux converging to a point, blurring of the light results. Since this is a diffraction phenomenon, the smaller the shielding S, the larger the blur spreads, but the intensity of the blurred light is lowered. In contrast, the larger the shielding S, the smaller the width of the blur becomes, but the intensity of the blurred light increases. However, when the shielding S is excessively large, it is observed as a shadow.

Figure 10:
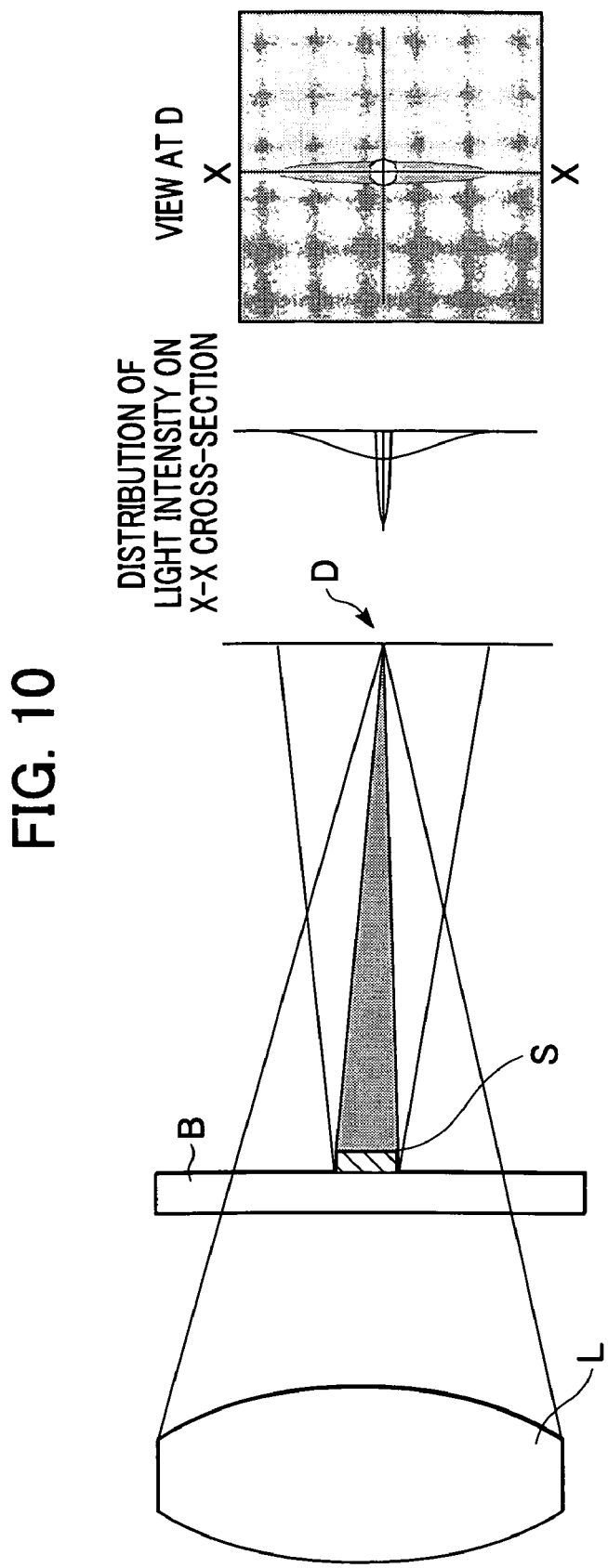
FIG. 10 is a diagram of striation patterns formed by utilizing Babinet's principle.

FIG. 10 shows expansion of the shielding S in the direction perpendicular to the plane of the drawing. In this case, the blurred light becomes linear. The cross pattern filter is configured to generate a linear blur of light (referred to as striation) by employing linear shielding. For example, when shielding having lines extending in two directions displaced by 90 degrees is provided, striations intersecting with an angle of 90 degrees are formed.

Various methods for arranging the shielding are apparent. For example, one example is a method of arranging narrow line-shaped shielding in a lattice-like pattern on a circular opening. Another example is a method of forming a lattice-like pattern on a transparent substrate by etching. Yet still, another example is a method of forming a lattice-like pattern by chrome. In the case where a lattice-like pattern is formed on the transparent substrate, the surface on which the pattern is formed may be either a plane surface or a curved surface. The same effects as the case where the shielding is provided may be obtained by forming a groove on the transparent substrate by patterning using replication, or by partly providing a diffusing surface thereon.

The difference in intensity of the light beam passing through the cross pattern filter 13 and detected by sensors provided on the position detecting photodetector 8 is transmitted to the mirror drive control unit 11 via the signal processing unit 10 as misalignment information. The mirror drive control unit 11 transmits an optical axis adjusting signal to the optical-axis adjusting unit 4 based on the misalignment information received. The optical-axis adjusting unit 4 changes the angle of the variable-angle mirror 4a based on the optical axis adjusting signal to adjust the optical axis. A cross pattern 21 formed by the cross pattern filter 13 is disposed on the position detection photodetector 8 so as not to overlap the parting lines 122, which divide the sensor shown in FIG. 2.

Since the position detecting light beam received by the position detecting photodetector 8 is converted into a cross pattern having at least two striations, and is disposed so as not to overlap the parting lines 122 dividing the sensor, but to intersect therewith the luminous flux does not completely enter the parting lines (blind zone) 122, and hence the position detecting light beam cannot be lost from sight without defocusing the converging point, even though the position detection photodetector 8 is arranged in a position adjacent to the converging point of the lens group 9. In addition, because most of the luminous flux entering the beam entrance M of the device, which corresponds to the entrance pupil, becomes the cross pattern 21 having high light-gathering characteristics and an intensity distribution more than $1/e^3$ in a peak of light amount, generated on the position detection photodetector 8 by the cross pattern filter 14, and hence is hardly affected by microscopic fluctuations of the atmospheric air, if at all.

An exemplary spot shape is one that satisfies the relational expressions:

$$L1/L2 > 3 \quad (1)$$

$$L1 > 2^{1/2} D \quad (2)$$

where L1 represents the length of the major axis of the spot, L2 represents the length of the minor axis of the spot, and D represents the width of the parting line of the position detecting photodetector.

Figure 2:
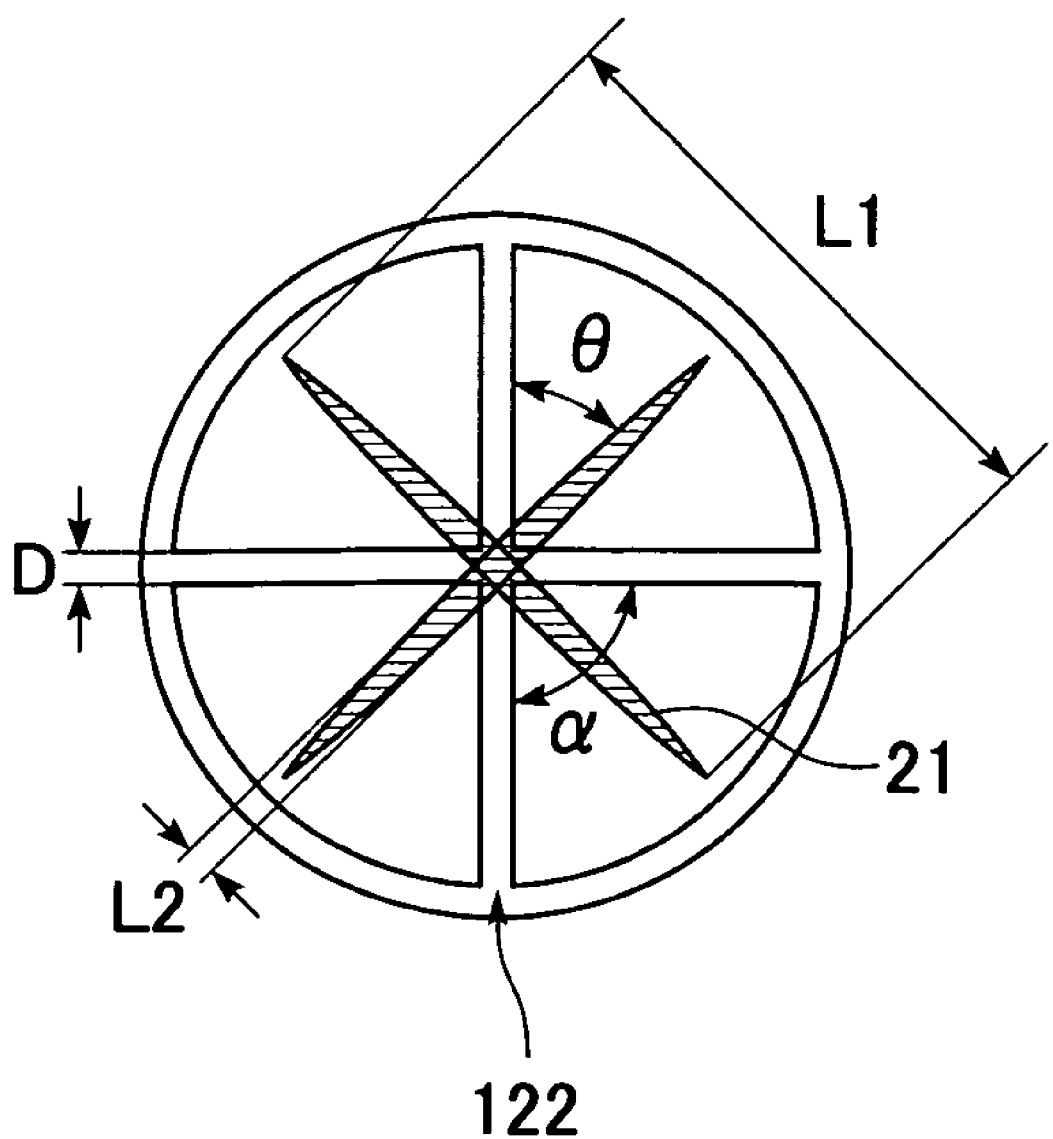
FIG. 2 is a drawing showing a light receiving state on a position detecting photodetector according to the embodiment.
Figure 3:
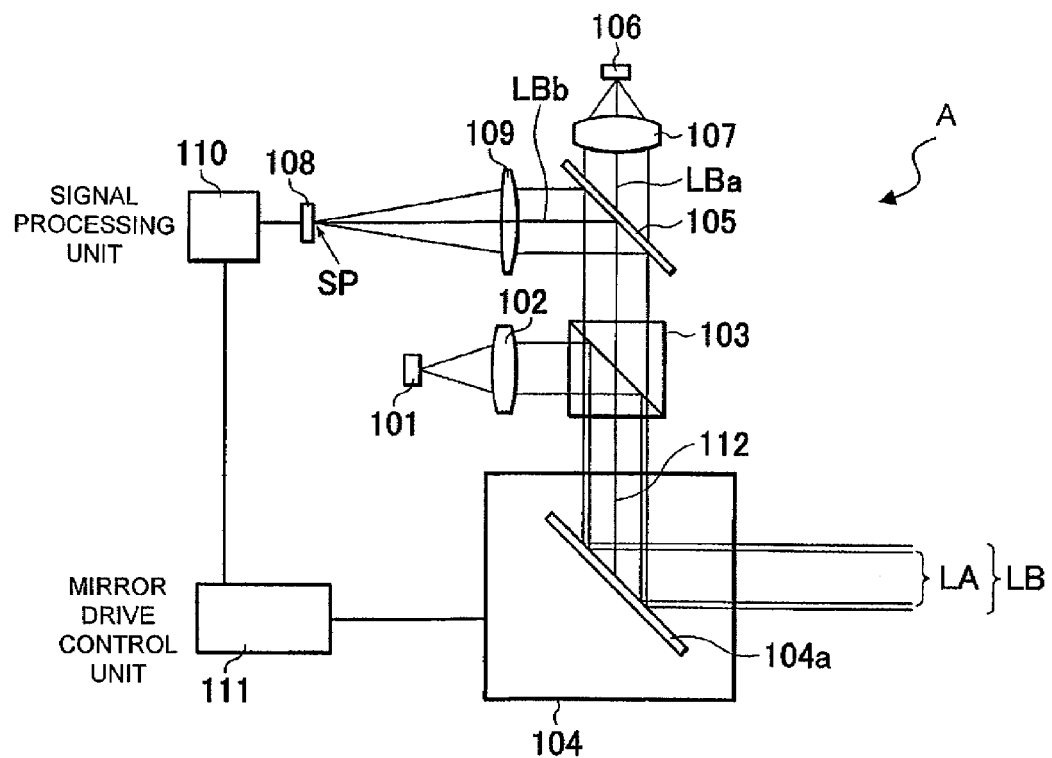
FIG. 3 is a block diagram of an optical transmission device in the related art.
Figure 4:
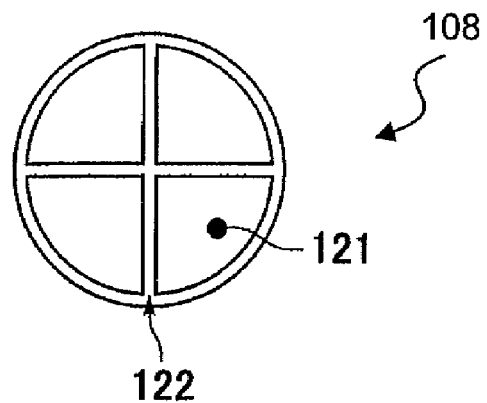
FIG. 4 is a front view of a position detecting photodetector.
Figure 5:
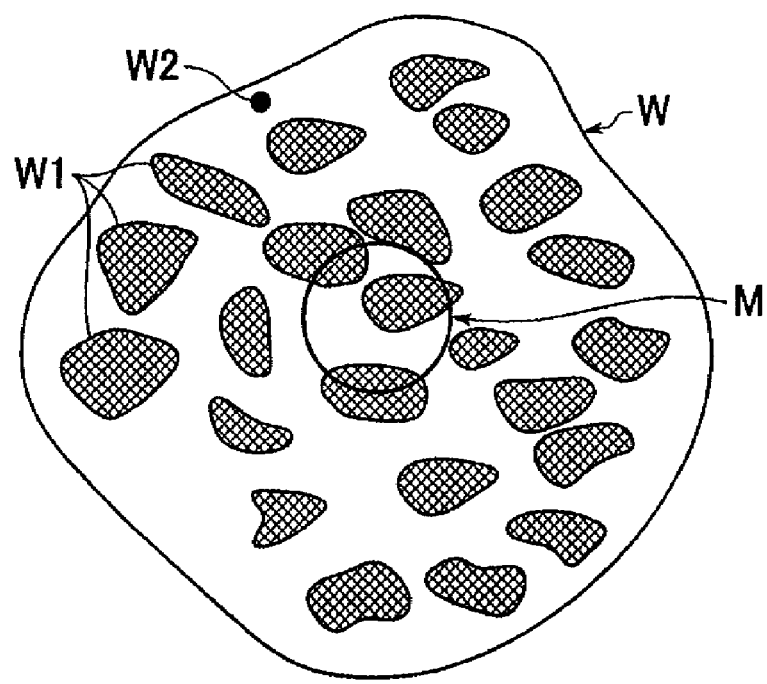
FIG. 5 is an explanatory drawing of modeled microscopic fluctuations of atmospheric air.
Figure 6:
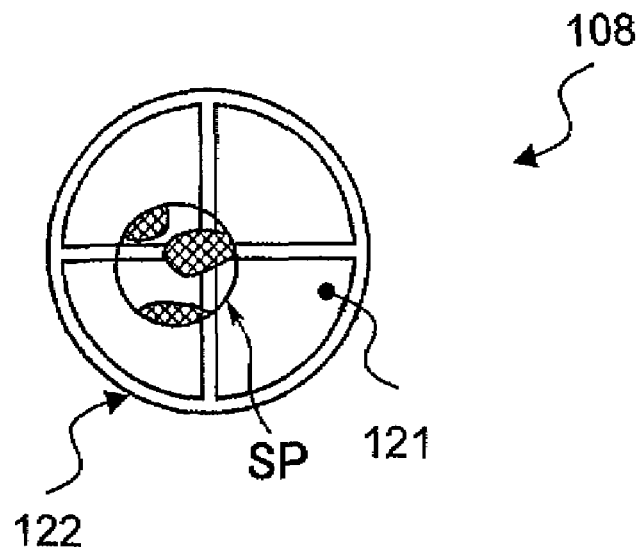
FIG. 6 is a drawing showing a light reception on the position detecting photodetector in an optical transmission device in the related art.
Figure 7:
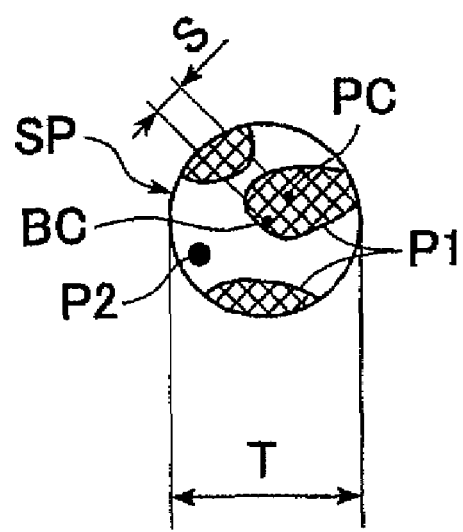
FIG. 7 is a drawing of a beam spot on the position detecting photodetector in the optical transmission device in the related art.

The conditional expression (1) shows that the spot shape is linear, as shown by the reference numeral 21 in FIG. 2. When the value is smaller than the lower limit of the conditional expression (1), the cross pattern is subjected to microscopic fluctuations. Therefore, by setting the value larger than the lower limit and making the spot shape as close to the line as possible, microscopic fluctuation effects are reduced.

The conditional expression (2) defines the longitudinal direction of the major axis of the linear spot shape, which is the minimum length of the spot shape required for the position detecting photodetector to receive light. Preferably, the value of L1 is at least twice the value of D, when considering the accuracy of parts constituting the optical transmission device and the sensitivity of the position detecting photodetector.

It is also preferable to allow the position detecting photodetector to receive light so that the angle θ formed between the parting line and the spot length L1 satisfies the following expression, where α represents an angle formed between the parting lines:

$$\sin^{-1}(D/L1) < |\theta| < \alpha - \sin^{-1}(D/L1) \quad (3)$$

When the value deviates from the upper and lower limit in the conditional expression (3), even though the value satisfies the conditional expressions (1) and (2), all the light beam enters the parting lines (blind zone) and hence the position detecting light beam is lost from sight. Preferably, the angle θ formed between the parting line and the spot length L1 is on the order of half the angle α formed between the parting lines when considering the accuracy of parts-constituting the optical transmission device and the sensitivity of the position detecting photodetector.

Since the exemplary size of the light receiving area of the position detecting photodetector is approximately 1 mm in diameter, and the width D of the parting line 122 is approximately 0.02 mm, assuming that the length L1 of the linear spot is 0.07 mm, the width L2 of the linear spot is 0.02 mm, the angle θ formed between the parting line and length L1 of the linear spot is 45 degrees, the angle α formed between the parting lines is 90 degrees, $$L1/L2 = 3.5$$

$$L1 = 0.07 = 3.5D$$

The lower limit=1.64 degrees and the upper limit=88.36 degrees according to the conditional expression (3), and hence the conditional expressions (1) to (3) are satisfied.

Figure 11:
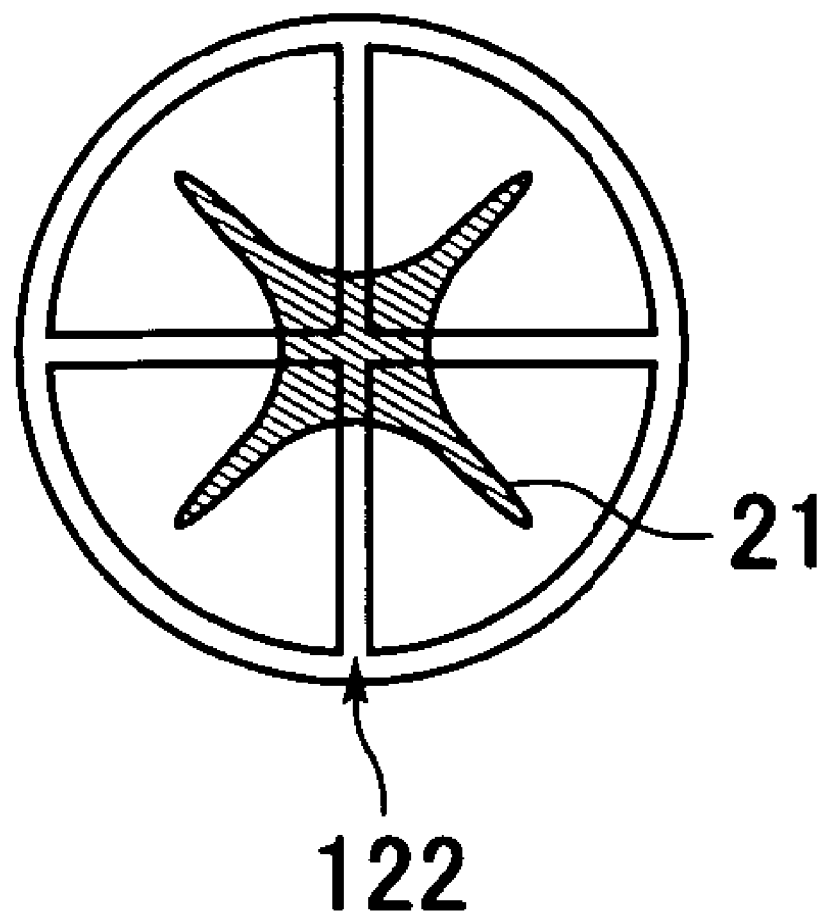
FIG. 11 is a drawing showing light convergence.

Therefore, stable optical communication unaffected by atmospheric microscopic fluctuations can be achieved. And, the all the luminous flux is prevented from entering the parting lines 122 (blind zone). The light converging on the position detecting photodetector 8 may be as shown in FIG. 11, for example, and does not have to be a strictly linear cross pattern as long as all the luminous flux does not enter into the parting lines 122.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical transmission device for communicating with a partner device, the optical transmission device comprising:
   a transmission unit configured to convert an electrical signal to an optical signal;
   a light receiving unit configured to convert a received optical signal to an electrical signal, the light receiving unit including a position detecting photodetector having a plurality of light receiving areas divided by parting lines for detecting the direction of incidence of a luminous flux emitted from the partner device; and
   a filter unit configured to receive and guide a luminous flux emitted from the partner device onto the position detecting photodetector and converting the shape of the luminous flux into a predetermined shape on the position detecting photodetetctor,
   wherein the predetermined shape satisfies the following relations:

$$L1/L2 > 3 \text{ and } L1 > 2^{1/2}D$$

where L1 represents the length of the predetermined shape in the direction of the major axis, L2 represents the length of the predetermined shape in the direction of the minor axis, and D represents the width of the parting lines, and
   wherein the parting lines intersect with the major axis in the predetermined shape.

2. The optical transmission device according to claim 1, wherein the predetermined shape is a cross pattern in which at least two of the patterns overlap with each other.

3. The optical transmission device according to claim 1, wherein the filter is a cross pattern filter.

4. The optical transmission device according to claim 1, wherein the plurality of light receiving areas are substantially the same size, and wherein the relation:

$$\sin^{-1}(D/L1) < |\theta| < \alpha - \sin^{-1}(D/L1)$$

is satisfied, where D represents the width of the parting lines, $\alpha$ represents the angle formed by the parting lines, and $\theta$ represents the angle formed by the parting lines and the predetermined shape.

5. The optical transmission device according to claim 1, further comprising:
   an optical axis adjuster disposed closer to the partner device than the filter; and
   a controller configured to control the optical axis adjuster based on an electrical signal sent from the light receiving unit.

6. An optical transmission device comprising:
   a sensor configured to receive a luminous flux emitted from a partner device, a light receiving surface of the sensor being divided into a plurality of light receiving areas by parting lines; and
   a filter configured to guide the luminous flux emitted from the partner device to the sensor, wherein the filter converts the shape of the luminous flux on the light receiving surface of the sensor into a predetermined shape,
   wherein the predetermined shape satisfies the relationship $$L1/L2 > 3 \text{ and } L1 > 2^{1/2}D,$$

where L1 represents the length of the predetermined shape in a direction of a major axis, L2 represents the length of the predetermined shape in a direction of a minor axis, and D represents a width of the parting lines, and
   wherein the parting lines intersect the major axis of the predetermined shape.

7. The optical transmission device according to claim 6, further comprising:
   an optical axis adjuster disposed closer to the partner device than the filter; and
   a controller configured to control the optical axis adjuster based on output from the sensor.

* * * * *